US006930594B1

(12) United States Patent
Wang

(10) Patent No.: US 6,930,594 B1
(45) Date of Patent: Aug. 16, 2005

(54) ELECTRONICALLY-ACTIVE VEHICLE GEAR-SHIFT KNOB

(76) Inventor: Calvin Wang, 768 S. Turnbull Canyon Rd., City of Industry, CA (US) 91745

( * ) Notice: Subject to any disclaimer, the term of this patent is extended or adjusted under 35 U.S.C. 154(b) by 98 days.

(21) Appl. No.: 10/682,267

(22) Filed: Oct. 8, 2003

(51) Int. Cl.$^7$ .............................................. B60Q 1/00
(52) U.S. Cl. ............ 340/456; 340/825.69; 340/825.72; 340/426.16; 341/173; 200/61.91; 200/43.17; 200/61.28; 74/473.19
(58) Field of Search ..................... 340/456, 815.45, 340/438, 999, 461, 825.69, 825.72, 479, 340/463, 464–467; 74/473.19, 498, 473.3; 341/173, 34, 22; 701/9.1, 10.1; 200/61.28, 200/61.88, 61.91, 43.17

(56) References Cited

U.S. PATENT DOCUMENTS

| 5,172,603 | A | * | 12/1992 | MacInnis ..................... 74/335 |
| 5,481,077 | A | * | 1/1996 | Clegg et al. ............. 200/61.88 |
| 5,602,525 | A | * | 2/1997 | Hsu ........................... 340/456 |
| 5,803,217 | A | * | 9/1998 | Park ......................... 192/3.31 |
| 5,957,001 | A | * | 9/1999 | Gualtieri et al. ......... 74/473.12 |

* cited by examiner

Primary Examiner—Jeffery Hofsass
Assistant Examiner—Eric M. Blount
(74) Attorney, Agent, or Firm—Albert O. Cota

(57) ABSTRACT

An electronically-active vehicle gear-shift knob (10) consisting of a hand-grasping section (12), an electronics enclosure (44) that is attached to an upper edge (14) of the hand-grasping section (12), and an electronics control circuit (90) consisting of a transmitting circuit (92) and a remotely located receiving circuit (94). The enclosure (44) includes a set of four pushbutton switches (92E) that are connected to the transmitting circuit (92). The closure of any one of the pushbutton switches (92E) allows the transmitting circuit (92) to produce an RF output signal (19) that is radiated via an antenna (92H) to the receiving circuit (94). The receiving circuit (94) subsequently processes the RF output signal (19) and produces an output control signal (29) that energizes an LED light corresponding to the specific pushbutton switch (92E)that has been closed.

19 Claims, 4 Drawing Sheets

US 6,930,594 B1

ELECTRONICALLY-ACTIVE VEHICLE GEAR-SHIFT KNOB

TECHNICAL FIELD

The invention pertains to the general field of vehicle gear-shift knobs and more particularly to an electronically-active gear-shift knob having a set of switches that control the operation of a set of remotely located vehicle implements, such as a set of lights.

BACKGROUND ART

The use of gear-shift knobs have long been a standard item of both manual and automatic transmissions. The primary function of the prior art knobs is to allow the transmission gear to be placed in a selected drive ratio. Background art also discloses several types of auxiliary lights, and in particular LED lights, that can be located throughout the vehicle to enhance safety or to add to the aesthetics of the vehicle. The LED lights are usually connected to be turned on one at-a-time or in combination by a set of switches or by a single master switch. Typically, the switches are located on a bracket that is attached ner or below the vehicle instrument panel.

A search of prior art patents and industry literature did not disclose a vehicle gear-shift knob having a set of integral switches that remotely control the operation of a set of lights or the like.

DISCLOSURE OF THE INVENTION

The electronically-active vehicle gear-shift knob is designed to activate a set of four remotely located vehicle implements such as LED lights. In its basic design, the electronically-active vehicle gear-shift knob is comprised of:

A hand-grasping section having an upper edge and a lower edge, wherein the lower edge has means for being attached to a vehicle gear-shift lever, An electronics enclosure having an upper surface and a lower surface, wherein the lower surface has means for being releasably attached to the upper edge of the hand-grasping section, and An electronics control circuit consisting of a transmitting circuit and a receiving circuit.

The transmitting circuit is enclosed within the electronic enclosure and has means for selectively producing an RF output signal corresponding to a specific vehicle implement such as an LED light. The receiving circuit, which is remotely located, has means for receiving the RF output signal provided by the transmitting circuit and producing an output control signal that energizes a specific LED light.

The transmitting circuit is further comprised of an encoder that operates in combination with four pushbutton switches that are accessibly located on the upper surface of the electronics enclosure. Each of the pushbutton switches produces a unique encoded code signal that is applied to the encoder. The encoder then produces a unique digital output signal that is applied to a transmitter module. The transmitter module subsequently produces the RF output signal that is applied via an antenna to a receiver module located in the receiving circuit.

The receiver module processes the RF output signal and produces a serial digital output signal that is applied to a microcontroller. Depending upon which of pushbutton switches is pressed, the microcontroller produces an output control signal that activates one of the four remotely located LED lights.

In view of the above disclosure, the primary object of the invention is to produce an electronically-active vehicle gear-shift knob that includes a set of easily accessible pushbutton switches. When any one switch is pressed, a specific LED light is activated; by repressing the same switch, the specific LED light is deactivated.

In addition to the primary object of the invention it is also an object of the invention to produce an electronically-active vehicle gear-shift knob that:

includes a spring-released cover that prevents the accidental closing of any of the pushbutton switches, can be manufactured in metal or plastic in various colors, that can be manufactured in various designs, and is cost effective from both a consumer's and a manufacturer's points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
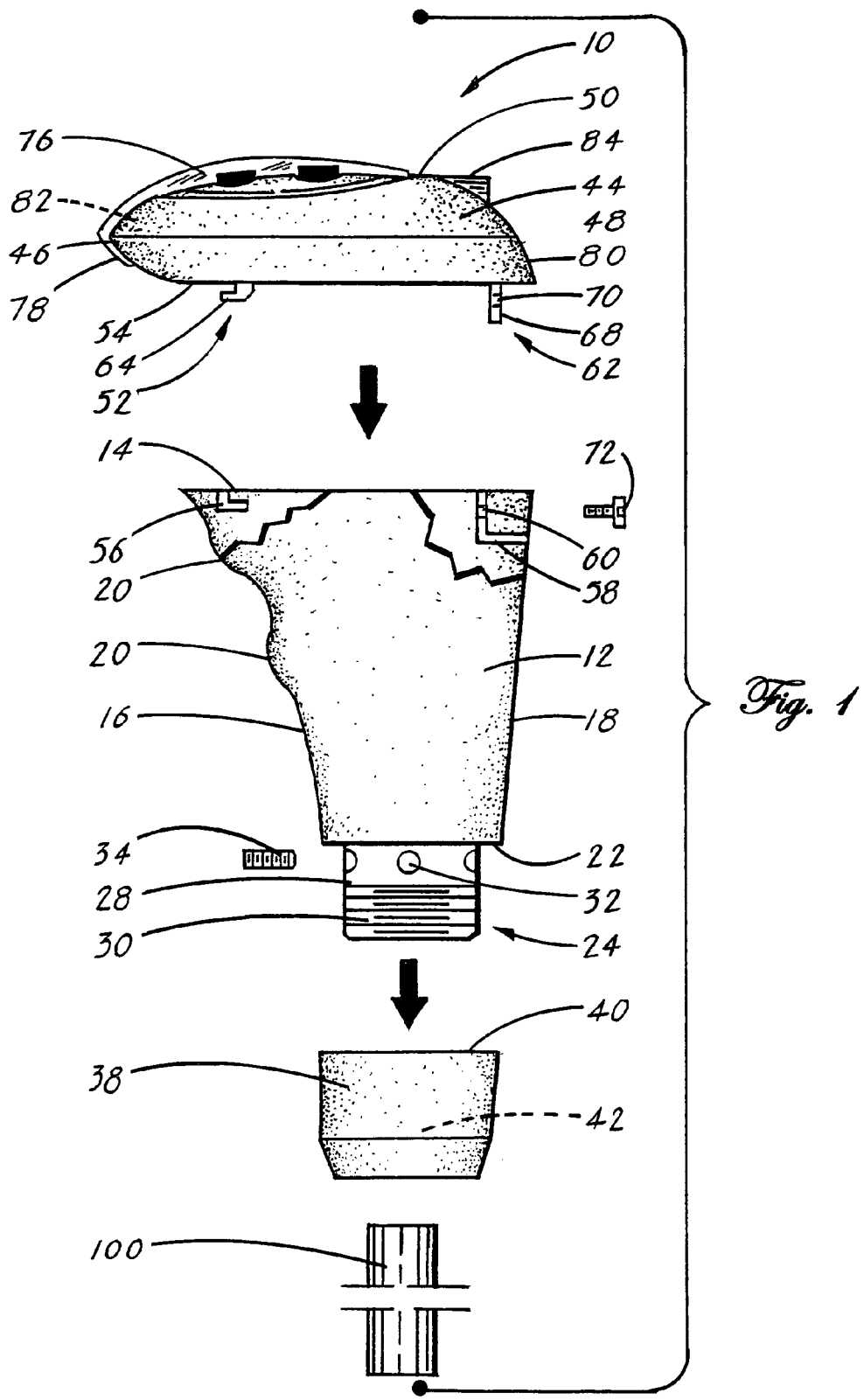
FIG. 1 is an exploded side elevational view of the electronically-activated vehicle gear-shift knob.

The best mode for carrying out the invention is presented in terms of a preferred embodiment for an electronically-active vehicle gear-shift knob 10 (hereinafter "the gear-shift knob 10"). The gear-shift knob 10 incorporates a set of switches, with each switch controlling the operation of a specifically selected and remotely located vehicle element, such as a light.

The preferred embodiment of the gear-shift knob 10, as shown in FIGS. 1–5, is comprised of three major elements: a hand-grasping section 12, an electronics enclosure 44, and an electronics control circuit 90 which includes a transmitting circuit 92 and a remotely located receiving circuit 94.

Figure 3:
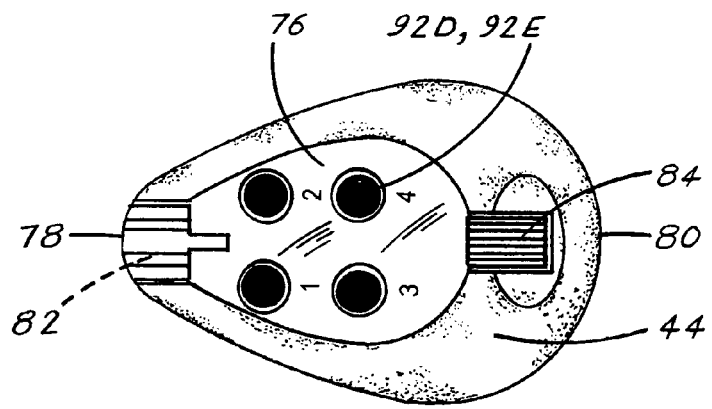
FIG. 3 is a top plan view of the gear-shift knob.
Figure 2:
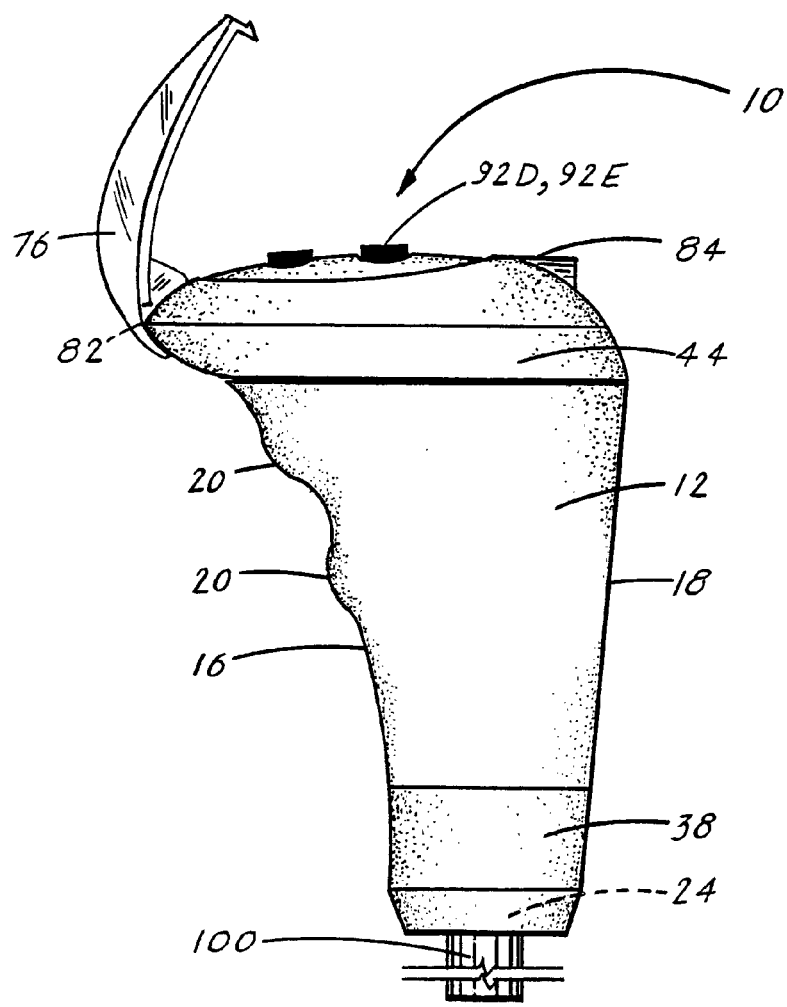
FIG. 2 is a side elevational view of the gear-shift knob showing an electronics enclosure with a transparent cover that is in an upward position which allows access to a set of pushbutton switches located on an upper surface of the electronics enclosure.

The hand-grasping section 12, as shown in FIGS. 1, 2 and 3, is preferably constructed of a metal and includes an upper edge 14, a front surface 16, a rear surface 18, a lower edge 22, and a means 24 for being attached to a vehicle gear-shift lever 100. The front surface 16 preferably includes a set of finger-gripping indentations 20 that provide a positive grip when the hand-grasping section 12 is being held and used.

The means 24 for attaching the hand-grasping section 12 to the vehicle gear-shift lever 100 is accomplished by integrally attaching a sleeve 28 that extends downward from the lower edge 22 of the hand-grasping section 12. The sleeve 28 has a lower external threaded section 30, as shown in FIG. 1, that includes a set of perpendicular threaded bores 32. Into each of the bores 32 is threaded a set screw 34 that impinges upon and secures the hand-grasping section 12 to the vehicle gear-shift lever 100. To complete the attachment, a housing 38, as also shown in FIGS. 1 and 2, includes a set of internal threads 42 that are dimensioned to thread into the lower external threaded section 30 located on the downward-extending sleeve 28. When the housing 38 is fully threaded, the upper edge 40 of the housing interfaces with the lower edge 32 of the hand-grasping section 12, as shown in FIG. 2.

The electronics enclosure 44, as shown in FIGS. 1 and 2, is designed to enclose the transmitting circuit 92 (described infra) and is comprised of a front edge 46, a rear edge 48, an upper surface 50, and a lower surface 54. The lower surface 54 includes a means 52 for being attached to the upper edge 14 of the hand-grasping section 12.

The attachment means 52 is accomplished by locating adjacent the upper edge 14 and the front surface 16 of the hand-grasping section 12, an inward-extending lip 56; and adjacent the upper edge 14 and the rear surface 18 a downward-extending tab 58 having a threaded bore 60, as shown in FIG. 1. To complete the attachment means 52 the electronics enclosure 44 has adjacent the front edge 46 a forward-extending tab 64 that engages the inward-extending lip 56 on the hand-grasping section 12. The electronics enclosure 44 also has a downward-extending rear tab 68 having a tab bore 70 that is in alignment with the threaded bore 60, as also shown in FIG. 1. When the forward-extending tab 64 and the inward-extending lip 56 are engaged and a threaded bolt 72 is inserted through the downward-extending rear tab 68 and threaded into the threaded bore 60, the electronics enclosure 14 is attached to the hand-grasping section 12, as shown in FIG. 2.

The upper surface 50 of the electronics enclosure 50 further comprises a transparent cover 76 that has a front edge 78 and a rear edge 80, as shown in FIGS. 1, 2 and 3. The front edge 78 is compressively hinged by a spring 82 and the rear edge 80 is normally held closed, as shown in FIG. 1, by means of a spring clip 84. When the transparent cover is closed, a set of four pushbutton switches 92E (described infra) cannot be accessed; conversely, when the spring clip 84 is depressed, the transparent cover 76 is released upward, as shown in FIG. 2, allowing access to the four pushbutton switches 92E.

The above disclosure describes the mechanical design of the electronically-active vehicle gear-shift knob 10. The disclosure that follows covers the electronics control circuit 90 which includes the transmitting circuit 92 and the remotely located receiving circuit 94.

Figure 4:
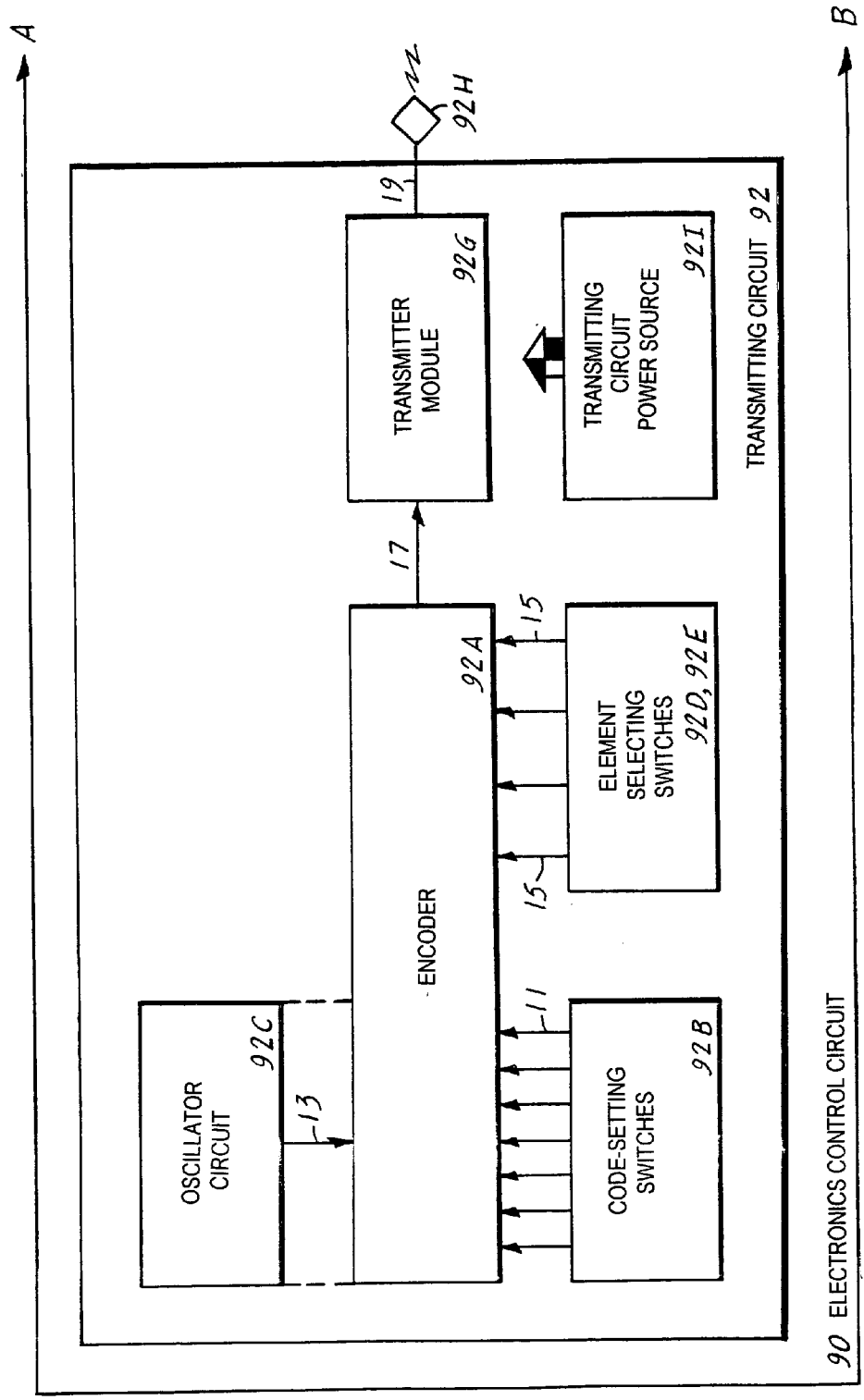
FIG. 4 is a block diagram of a transmitting circuit which is a subset of an electronics control circuit.

The transmitting circuit 92 which is enclosed within the electronics enclosure 44 functions in combination with the receiving circuit 94 which is remotely located within the confines of the vehicle. The transmitting circuit 92, as shown in FIG. 4, is comprised of seven major elements: an encoder 92A, code setting switches 92B, an oscillator circuit 92C, element-selecting switches 92D, isolation diodes 92F, a transmitter module 92G and a power source 92I.

The encoder 92A, which preferably consists of a Holtek HT-12E or the like, includes an input consisting of a plurality of the code setting switches 92B. The arrangement and setting of the switches 92B produces a unique address code 11 that is applied to the encoder 92A. The oscillator circuit 92C functions to produce a fixed clock frequency 13.

The activation of the transmitting circuit 92 is provided by a set of element-selecting switches 92D. The closing of any one of the switches 92D produces an encoded signal 15 that is peculiar to the closed switch 92D.

Preferably, the set of element-selecting switches 92D consists of four pushbutton switches 92E that operate independently of each other. The pushbutton switches 92E are accessible via the upper surface 50 of the electronics enclosure 44 when the transparent cover 76 is released, as shown in FIG. 2.

The encoder signal 15 consists of a serial digital code along with a unique address code as determined by the settings of the code-setting switches 92B. The encoded signal 15 is further modulated by the fixed clock frequency produced by the oscillator circuit 92C to allow the encoder 92A to produce a unique digital output signal 17.

The transmitter module 92G has means for receiving and processing the digital output signal 17 and subsequently producing an RF output signal 19. The RF signal 19, as shown in FIG. 4, is radiated through a transmitting antenna 92H that is embedded within the electronics enclosure 44. The final element of the transmitting circuit 92 is the transmitting circuit power source 92I which is comprised of a d-c cell selected to provide the required power levels. The d-c cell, which preferably is comprised of an L1028 12-Volt alkaline cell, is placed within a cavity (not shown) located on the lower surface 54 of the electronics enclosure 44.

Figure 5:
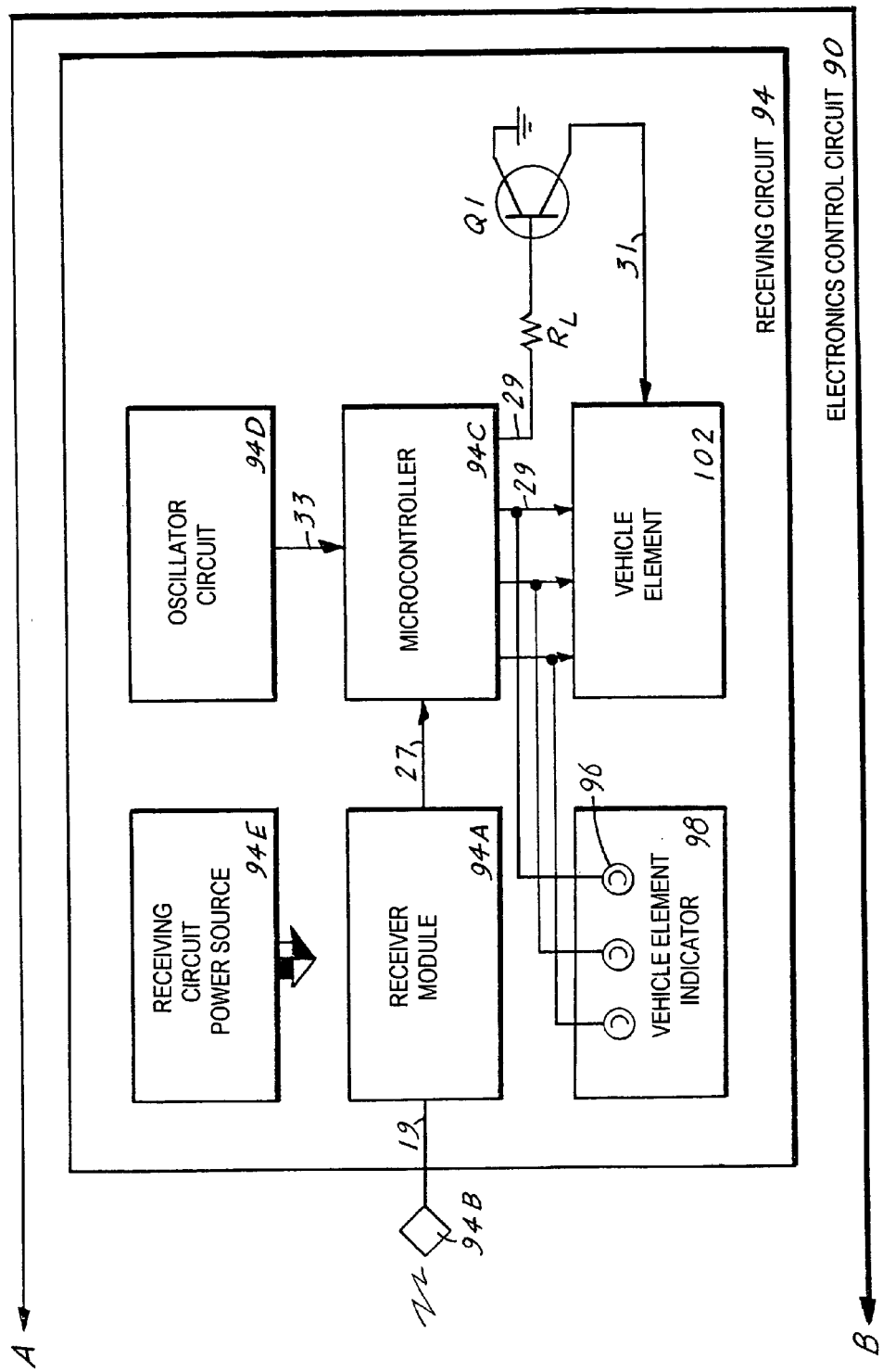
FIG. 5 is a block diagram of a receiving circuit which is a subset of the electronics control circuit.

The receiving circuit 94, as shown in FIG. 5, is comprised of a receiving module 94A, a receiving antenna 94B, a microcontroller 94C, an oscillator circuit 94D and a receiving circuit power source 94E.

The receiving module 94A has means for receiving and processing the radiated RF signal 19 provided by the transmitter module 92G. The signal is received by the receiving antenna 94B, which is physically located within the vehicle to provide optimum signal receiving strength. The output of the receiver module 94A is a serial digital output signal 27 that is applied to the microcontroller 94C.

The microcontroller 94C has means for receiving and processing the serial digital output signal 27 and producing an output control signal 29. The characteristics of the signal 29 are determined by which of the pushbutton switches 92E, located on the transmitting circuit 42, is closed. Each of the control signals 29 is connected to a specific element of a vehicle, such as an auxiliary LED light. When the first pushbutton switch 92E is closed, the vehicle element i.e., the auxiliary LED light, is energized. Conversely, when the first pushbutton switch 92E is pressed again the microcontroller 94C causes the vehicle element to de-energize.

The microcontroller 94C is comprised of a PIC microcontroller that is preferably selected from an automotive series PIC microcontroller that allows the microcontroller 94C to be powered directly from a vehicle 23-volt d-c power source. This design includes a code-learning circuit that is activated during the power-up sequence and assures that only the specific unique digital signal 17 produced by the encoder 92A is being processed by the microcontroller 94C.

As shown in FIG. 5, at least one of the four output control signals 29 from the microcontroller 94C can be modified. The modification consists of connecting the output to a current limiting resistor $R_L$ that is placed in series with the base of an NPN transistor Q1 or MOSFET. The output of the transistor Q1 is a high-current control signal 31 that enables the microcontroller 94C to switch to a relatively high current in order to operate a device such as a high-intensity lamp, a relay, a solenoid or the like.

The receiving circuit 94, as shown in FIG. 5, also includes the oscillator circuit 94D, which produces a fixed clock frequency 33 and the receiving circuit power source 94E that is designed to provide the receiving circuit 94 with the required power levels.

While the invention has been described in complete detail and pictorially shown in the accompanying drawings it is not to be limited to such details, since many changes and modifications may be made in the invention without departing from the spirit and scope thereof. For example, as shown in FIG. 5, the output control signals 29 from the microcontroller 94C can be connected in parallel with a corresponding set of LEDs 96 that are located on a remotely-located vehicle element indicator 98. When a particular pushbutton switch 92E is closed, a corresponding vehicle element is activated, likewise a particular LED 96 that corresponds to the vehicle element illuminates. Thus, a user of the inventive gear-shift knob 10 can visually determine which vehicle element has been activated. Hence, it is described to cover any and all modifications and forms which may come within the language and scope of the appended claims.

What is claimed is:

1. An electronically-active vehicle gear-shift knob comprising:
   A. a hand-grasping section having an upper edge, a front surface, a rear surface, and a lower edge having means for being attached to a vehicle gear-shift lever,
   B. an electronics enclosure having a front edge, a rear edge, an upper surface, and a lower surface having means for being releasably attached to the upper edge of said hand-grasping section,
   C. an electronics control circuit comprising:
      a) a transmitting circuit enclosed within said electronics enclosure and comprising:
         (1) an encoder comprising:
            (a) an input consisting of a plurality of code-setting switches that are set to produce a unique address code,
            (b) an oscillator circuit that produces a fixed clock frequency,
            (c) a set of element-selecting switches, wherein the closing of any one of the switches produces an encoded signal that is unique to the closed switch, wherein the encoded signal consists of a serial digital code along with a unique address code as determined by the settings of the code-setting switches, wherein the encoded signal is further modulated by the fixed clock frequency produced by the oscillator circuit to allow the encoder to produce a unique digital output signal,
         (2) a transmitter module having means for receiving and processing the unique digital output signal and producing a corresponding RF output signal that is radiated through a transmitting antenna embedded within said electronics enclosure,
         (3) a transmitting circuit power source,
      b) a receiving circuit comprising:
         (1) a receiver module having means for receiving and processing, via a receiving antenna, the radiated RF output signal from the transmitter module and producing a serial digital output signal,
         (2) a microcontroller having means for receiving and processing the serial digital output signal and producing an output control signal that is determined by which of the element-selecting switches located on said transmitting circuit is closed, wherein each of the output control signals is connected to a specific element of a vehicle, wherein when a first element-selecting switch is closed, the element controlled by the first switch is energized; conversely, when the first switch is pressed again the vehicle element is de-energized,
         (3) an oscillator circuit that produces a fixed clock frequency, and
         (4) a receiving circuit power source.

2. The gear-shift knob as specified in claim 1 wherein the front surface of said hand-grasping section further comprises a set of finger-gripping indentations.

3. The gear-shift knob as specified in claim 2 wherein said means for attaching the vehicle gear-shift knob to the vehicle gear-shift lever comprises:
   a) the lower edge of said hand-grasping section further comprising a downward-extending sleeve having a lower, external threaded section having a set of perpendicular threaded bores into which is threaded a like set of set screws that impinge upon and secure the vehicle gear-shift level, and
   b) a housing having an upper edge and a set of internal threads dimensioned to thread into the lower, external threaded section on the downward-extending sleeve, wherein when the housing is fully threaded, the upper edge of said housing interfaces with the lower edge of said hand-grasping section.

4. The gear-shift knob as specified in claim 1 wherein said means for releasably attaching the lower surface of said electronics enclosure to the upper edge of said hand-grasping section comprises:
   a) said hand-grasping section having adjacent the upper edge and the front surface an inward-extending lip, and adjacent the upper edge and the rear surface a downward-extending tab having a threaded bore, and
   b) said electronics enclosure having adjacent the front edge and lower surface a forward-extending tab that engages the inward-extending lip on said hand-grasping section, and adjacent the rear edge and the lower surface is located a downward-extending rear tab having a tab bore that is in alignment with the threaded bore, wherein when the forward-extending tab and inward-extending lip are engaged and a threaded bolt is inserted through the downward-extending rear tab and threaded into the threaded bore, the electronics enclosure is securely attached to the hand-grasping section.

5. The gear-shift knob as specified in claim 1 wherein said set of element-selecting switches are comprised of four momentary-on pushbutton switches that operate independently of each other.

6. The gear-shift knob as specified in claim 5 wherein said set of four pushbutton switches are accessible via the upper surface of said electronics enclosure.

7. The gear-shift knob as specified in claim 6 wherein the upper surface of said electronic enclosure further comprises a transparent cover having a front edge and a rear edge, wherein the front edge is compressively hinged by a spring and the rear edge is normally held closed by means of a spring clip, wherein when the transparent cover is closed the four pushbutton switches cannot be accessed; conversely, when the spring clip is depressed, the transparent cover is released upward, thus allowing access to the four pushbutton switches.

8. The gear-shift knob as specified in claim 1 wherein said encoder is comprised of a Holtek HT-12E encoder.

9. The gear-shift knob as specified in claim 1 wherein said transmitting circuit power source is comprised of a d-c cell selected to provide the required power levels.

10. The gear-shift knob as specified in claim 9 wherein said d-c cell is comprised of an L1028 alkaline cell.

11. The gear-shift knob as specified in claim 1 wherein the receiving antenna is physically located to provide optimum signal receiving strength.

12. The gear-shift knob as specified in claim 11 wherein said microcontroller is comprised of a PIC microcontroller.

13. The gear-shift knob as specified in claim 12 wherein said PIC microcontroller is comprised of an automotive series PIC microcontroller that allows the microcontroller to be powered directly from a vehicle 12-volt d-c power source.

14. The gear-shift knob as specified in claim 13 wherein at least one of the four output control signals from said microcontroller is modified by connecting the output to a current limiting resistor placed in series with the base of an NPN transistor or a MOSFET, wherein the output of the transistor or MOSFET is a high-current control signal that enables the microcontroller to switch to a large current in order to operate a device such as a high-intensity lamp, a relay or a solenoid.

15. The gear-shift knob as specified in claim 14 wherein the output control signals from said microcontroller are connected in parallel with a corresponding set of LEDs located on a remotely-located vehicle element indicator, wherein when a particular pushbutton switch is closed, a particular LED corresponding to the vehicle element illuminates thus, a user of said gear-shift knob can visually determine which vehicle element has been activated.

16. The gear-shift knob as specified in claim 1 wherein said receiving circuit power source is selected to provide the required power levels.

17. An electronically-active vehicle gear-shift knob comprising:

a) a hand-grasping section having an upper edge and a lower edge, wherein the lower edge has means for being attached to a vehicle gear-shift lever,
b) an electronics enclosure having an upper surface and a lower surface, wherein the lower surface has means for being releasably attached to the upper edge of said hand-grasping section,
c) an electronics control circuit comprising:
   (1) a transmitting circuit enclosed within said electronic enclosure, said transmitting circuit having means for selectively producing an RF output signal corresponding to a specific vehicle implement, and
   (2) a vehicle-remote receiving circuit having means for receiving the RF output signal from said transmitting circuit and producing an output control signal that energizes the specific vehicle element.

18. The gear-shift knob as specified in claim 17 wherein the specific vehicle implement is selected by pressing on one of a set of momentary pushbutton switches that are accessible via the upper surface of said electronics enclosure.

19. The gear-shift knob as specified in claim 18 wherein the upper surface of said electronic enclosure further comprises a transparent cover having a front edge and a rear edge, wherein the front edge is compressively hinged by a spring and the rear edge is normally held closed by means of a spring clip, wherein when the transparent cover is closed, the four pushbutton switches cannot be accessed; conversely, when the spring clip is depressed, the transparent cover is released upward, thus allowing access to the four pushbutton switches.

* * * * *